(12) United States Patent
Chou

(10) Patent No.: US 7,527,462 B2
(45) Date of Patent: May 5, 2009

(54) RATCHET CLUTCH TYPE CARGO BINDING DEVICE FOR WHEELED VEHICLE

(75) Inventor: Yeh-Chien Chou, Kuei Shang Hsiang (TW)

(73) Assignee: Strong Yun Industrial Co., Ltd., Taoyuan Hsien (TW)

( * ) Notice: Subject to any disclaimer, the term of this patent is extended or adjusted under 35 U.S.C. 154(b) by 399 days.

(21) Appl. No.: 11/433,338

(22) Filed: May 12, 2006

(65) Prior Publication Data

US 2007/0264098 A1    Nov. 15, 2007

(51) Int. Cl.
*B61D 45/00* (2006.01)
(52) U.S. Cl. ...................................... 410/103
(58) Field of Classification Search ............... 410/103, 410/101; 24/68 CD, 909
See application file for complete search history.

(56) References Cited

U.S. PATENT DOCUMENTS

| | | | | |
|---|---|---|---|---|
| 4,799,297 A | * | 1/1989 | Baggio et al. | 24/68 SK |
| 5,101,537 A | * | 4/1992 | Cummings | 24/68 CD |
| 2004/0013490 A1 | * | 1/2004 | Cauchon | 410/103 |
| 2006/0013667 A1 | * | 1/2006 | Ruan | 410/103 |

* cited by examiner

*Primary Examiner*—H Gutman
(74) *Attorney, Agent, or Firm*—Alan Kamrath; Kamrath & Associates PA

(57) ABSTRACT

A binding device for a wheeled vehicle includes a drive mechanism including a shaft tube, a driven member secured to the shaft tube, at least one driving pawl mounted on the driven member, and a drive member rotatably mounted on the driven member and having an inner wall formed with a plurality of locking grooves engaged with the driving pawl. Thus, the drive member drives the shaft tube to rotate in one direction and performs an idle rotation in the opposite direction, so that the shaft tube is rotatable successively to wind the binding strap successively so as to tighten the cargo without having to remove the drive rod from the drive member, thereby facilitating a user winding the binding strap, and thereby saving the working time and energy.

14 Claims, 5 Drawing Sheets

RATCHET CLUTCH TYPE CARGO BINDING DEVICE FOR WHEELED VEHICLE

BACKGROUND OF THE INVENTION

1. Field of the Invention

The present invention relates to a binding device and, more particularly, to a cargo binding device for a wheeled vehicle.

2. Description of the Related Art

A conventional binding device for a wheeled vehicle in accordance with the prior art shown in FIGS. 5 and 6 comprises a substantially U-shaped support bracket 1, a shaft tube 2 rotatably mounted on the support bracket 1 and having a first end integrally formed with a drive head 2a and having a peripheral wall formed with an elongated slot 2c for fixing a binding strap (not shown), a ratchet wheel 3 secured to a second end of the shaft tube 2 to rotate with the shaft tube 2, a support shaft 5 mounted on the support bracket 1, and a oneway locking pawl 4 having a first end pivotally mounted on the support shaft 5 and a second end detachably engaged with the ratchet wheel 3 so that the ratchet wheel 3 is rotatable in one direction only. The drive head 2a of the shaft tube 2 has a peripheral wall formed with two pairs of opposite passages 2b to allow passage of a drive rod (not shown).

In operation, the binding device is mounted on a first side of the wheeled vehicle, and the binding strap is reeved through the cargo and has a first end secured to the elongated slot 2c of the shaft tube 2 to rotate with the shaft tube 2 and a second end secured to a second side of the wheeled vehicle. Then, when the drive head 2a of the shaft tube 2 is rotated by the drive rod, the shaft tube 2 is rotated to wind the binding strap so as to tighten the cargo by the binding strap.

However, the rotation angle of the drive rod is easily limited by the side frame of the wheeled vehicle, so that when the drive rod is rotated to a determined angle, the user has to remove the drive rod from the respective pair of passages 2b and to insert the drive rod into another pair of passages 2b to continue the rotation of the drive rod. Thus, the drive rod cannot be rotated successively, so that the user has to remove the drive rod from the respective pair of passages 2b and to insert the drive rod into another pair of passages 2b repeatedly, thereby greatly causing inconvenience to the user when winding the binding strap, and thereby wasting the working time and energy.

BRIEF SUMMARY OF THE INVENTION

In accordance with the present invention, there is provided a binding device, comprising a drive mechanism including a shaft tube, a driven member having a first side secured to an end of the shaft tube to rotate the shaft tube, at least one driving pawl mounted on a second side of the driven member, and a drive member rotatably mounted on the second side of the driven member and having an inner wall formed with a plurality of locking grooves engaged with the driving pawl.

The primary objective of the present invention is to provide a ratchet clutch type binding device that is operated in a stageless manner so as to bind or unbind a cargo of a wheeled vehicle successively.

Another objective of the present invention is to provide a binding device, wherein the drive member is rotatable by the drive rod in a stageless manner, so that the shaft tube is rotatable by the drive member successively so as to wind the binding strap successively.

A further objective of the present invention is to provide a binding device, wherein the drive member drives the shaft tube to rotate in one direction only and performs an idle rotation in the opposite direction, so that the shaft tube is rotatable successively to wind the binding strap successively so as to tighten the cargo without having to remove the drive rod from the drive member, thereby facilitating a user winding the binding strap, and thereby saving the working time and energy.

A further objective of the present invention is to provide a binding device, wherein the user can operate the drive member to wind the binding strap successively without having to remove the drive rod from the drive member, so that the binding strap is tightened easily and rapidly, thereby enhancing the working efficiency.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
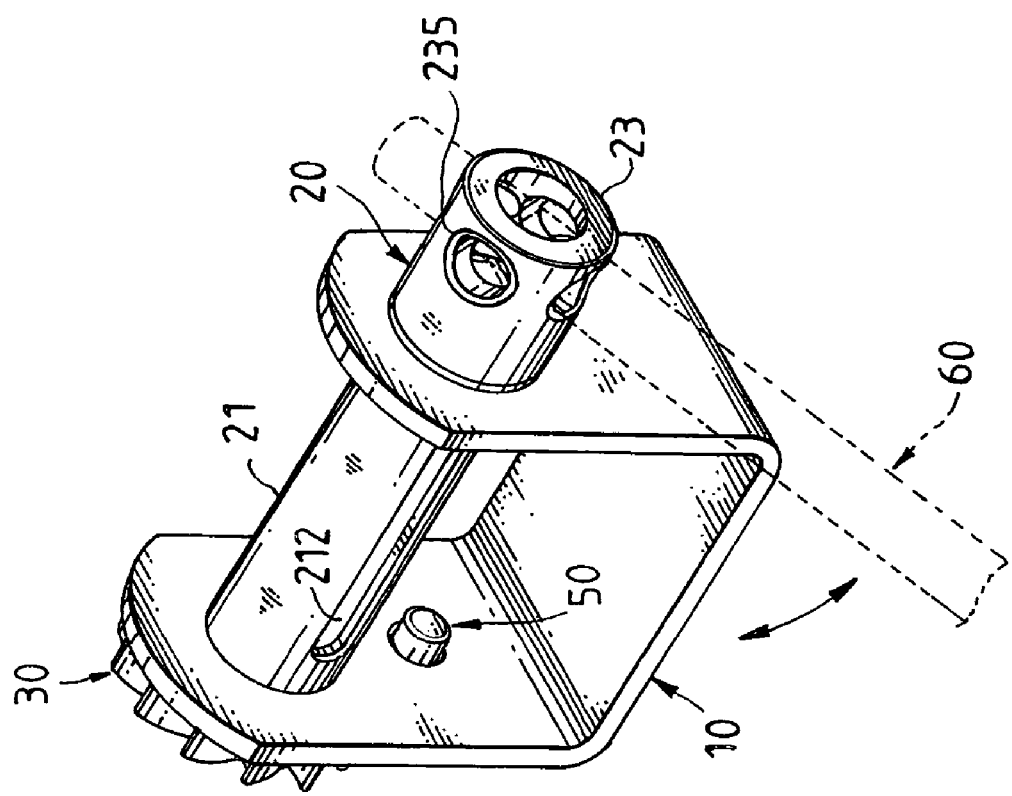
FIG. 1 is a perspective view of a binding device in accordance with the preferred embodiment of the present invention.
Figure 2:
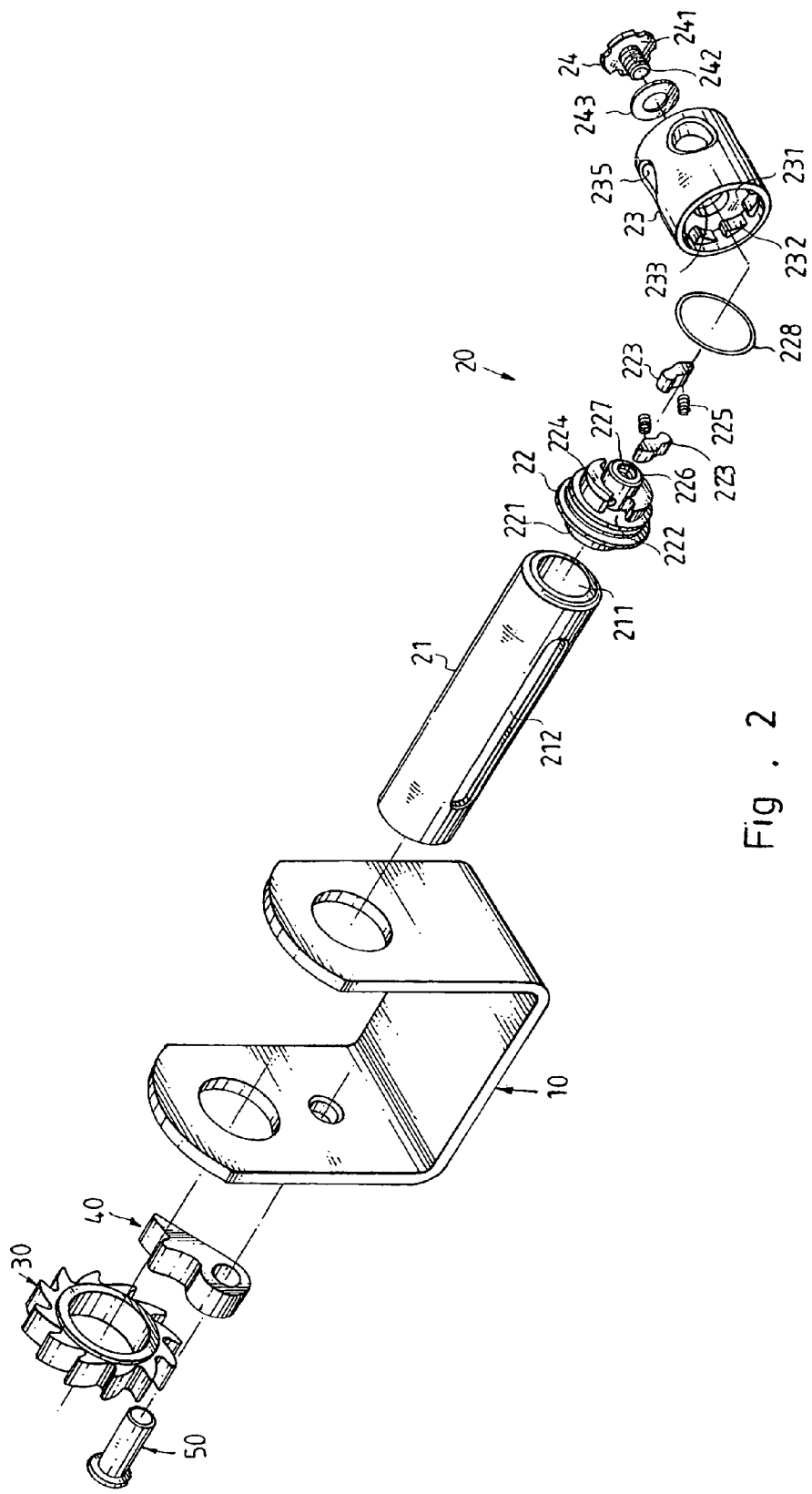
FIG. 2 is an exploded perspective view of the binding device as shown in FIG. 1.

Referring to the drawings and initially to FIG. 1, a binding device for a wheeled vehicle in accordance with the preferred embodiment of the present invention comprises a substantially U-shaped support bracket 10, and a drive mechanism 20 mounted on the support bracket 10.

Referring to FIGS. 1-4, the drive mechanism 20 includes a shaft tube 21 rotatably mounted on the support bracket 10, a driven member 22 having a first side secured to a first end of the shaft tube 21 to rotate the shaft tube 21, at least one driving pawl 223 mounted on a second side of the driven member 22, and a drive member 23 rotatably mounted on the second side of the driven member 22 and having an inner wall formed with a plurality of locking grooves 232 engaged with the driving pawl 223.

Thus, when the drive member 23 is rotatable in a first direction, the driving pawl 223 is locked by one of the locking grooves 232 of the drive member 23 to rotate with the drive member 23, so that the driven member 22 is rotatable with the drive member 23, and the shaft tube 21 is rotatable with the driven member 22, and when the drive member 23 is rotatable in a second direction, the driving pawl 223 is disengaged from the locking grooves 232 of the drive member 23, so that the driven member 22 is not rotatable with the drive member 23, and the drive member 23 performs an idle rotation.

The binding device further comprises a ratchet wheel 30 secured to a second end of the shaft tube 21 to rotate with the shaft tube 21, a support shaft 50 mounted on the support bracket 10, and a oneway locking pawl 40 having a first end pivotally mounted on the support shaft 50 and a second end detachably engaged with the ratchet wheel 30 so that the ratchet wheel 30 is rotatable in one direction only.

The shaft tube 21 has an inner wall formed with a shaft hole 211 and has a peripheral wall formed with an elongated slot 212 for fixing a binding strap (not shown).

The first side of the driven member 22 is formed with a plug 221 inserted into the shaft hole 211 of the shaft tube 21. The second side of the driven member 22 has a periphery formed with two opposite receiving recesses 222. Each of the receiving recesses 222 of the driven member 22 has a first side formed with a first receiving groove 220 and a second side formed with a second receiving groove 224. The second side of the driven member 22 has a central portion formed with a protruding threaded post 226 having an inside formed with a screw bore 227.

The drive mechanism 20 further includes a dustproof ring 228 mounted between the periphery of the second side of the driven member 22 and the inner wall of the drive member 23 to provide a dustproof function.

In the preferred embodiment of the present invention, the drive mechanism 20 includes two opposite driving pawls 223 each engaged with a respective one of the locking grooves 232 of the drive member 23. Each of the driving pawls 223 is pivotally mounted in a respective one of the receiving recesses 222 of the driven member 22 and has a first end engaged with the respective locking groove 232 of the drive member 23 and a second end received in the first receiving groove 220 of the driven member 22.

The drive mechanism 20 further includes two opposite restoring springs 225 each biased between the driven member 22 and a respective one of the driving pawls 223 to push the respective driving pawl 223 toward the respective locking groove 232 of the drive member 23. Each of the restoring springs 225 has a first end rested on a side of the first end of the respective driving pawl 223 to push the first end of the respective driving pawl 223 toward the respective locking groove 232 of the drive member 23 and a second end received in the second receiving groove 224 of the driven member 22.

Figure 3:
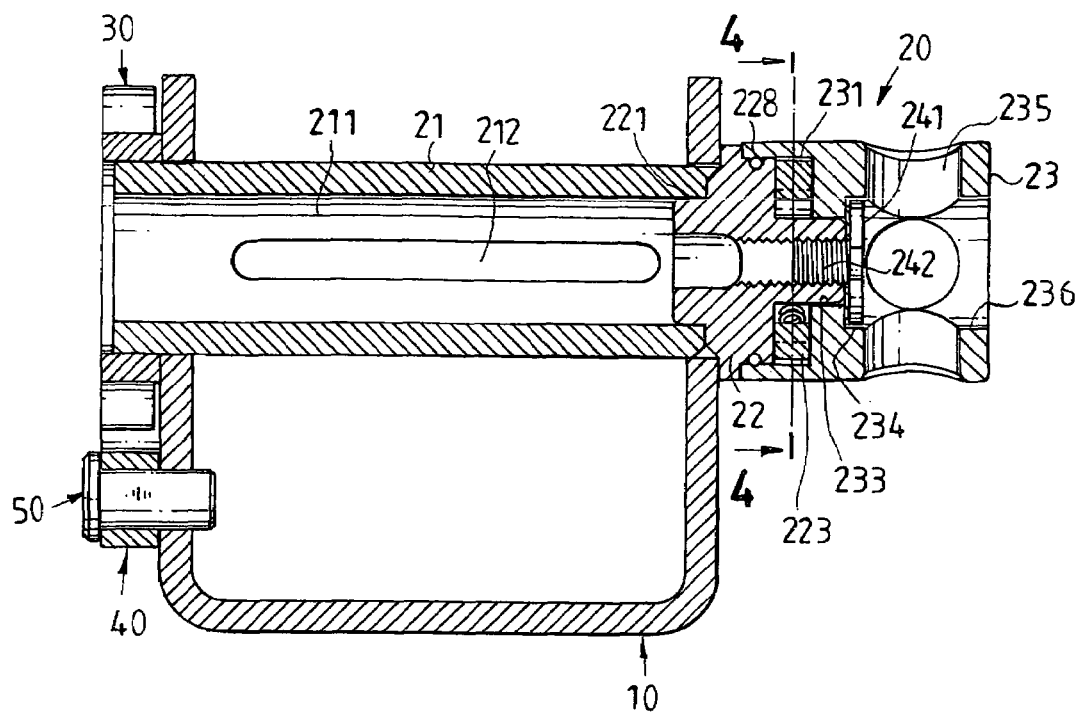
FIG. 3 is a plan cross-sectional view of the binding device as shown in FIG. 1.

In the preferred embodiment of the present invention, the drive member 23 has eight locking grooves 232. The inner wall of the drive member 23 has a first end formed with a mounting recess 231 mounted on the second side of the driven member 22 to encompass the driving pawl 223 as shown in FIG. 3, a mediate portion formed with a mounting hole 233 mounted on the threaded post 226 of the driven member 22 and a second end formed with a opening 236. The locking grooves 232 of the drive member 23 are located in the mounting recess 231. The inner wall of the drive member 23 is provided with a stepped stop face 234 located between the mounting hole 233 and the opening 236. The drive member 23 has a peripheral wall formed with at least two opposite passages 235 connected to the opening 236 to allow passage of a drive rod 60.

The drive mechanism 20 further includes a locking bolt 24 mounted in the opening 236 of the drive member 23 and having a bolt head 241 rested on the stop face 234 of the drive member 23 and a threaded portion 242 extended from the bolt head 241 and screwed into the screw bore 227 of the threaded post 226 of the driven member 22 to secure the drive member 23 to the driven member 22, and a dustproof washer 243 mounted on the threaded portion 242 of the locking bolt 24 and located between the stop face 234 of the drive member 23 and the bolt head 241 of the locking bolt 24 to provide a dustproof function.

In operation, referring to FIGS. 1-4, the binding device is mounted on a first side of the wheeled vehicle, and the binding strap is reeved through the cargo and has a first end secured to the elongated slot 212 of the shaft tube 21 to rotate with the shaft tube 21 and a second end secured to a second side of the wheeled vehicle. Then, the drive member 23 is rotated by the drive rod 60 as shown in FIG. 1.

Figure 4:
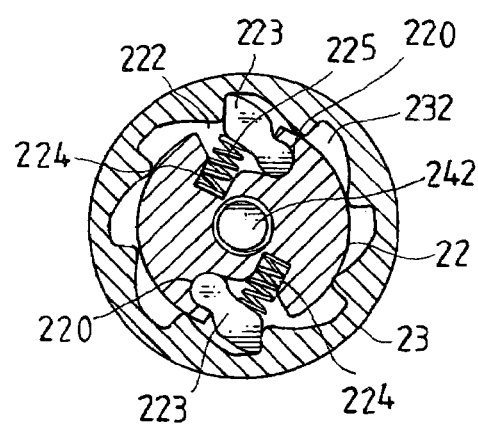
FIG. 4 is a plan cross-sectional view of the binding device taken along line 4-4 as shown in FIG. 3.
Figure 5:
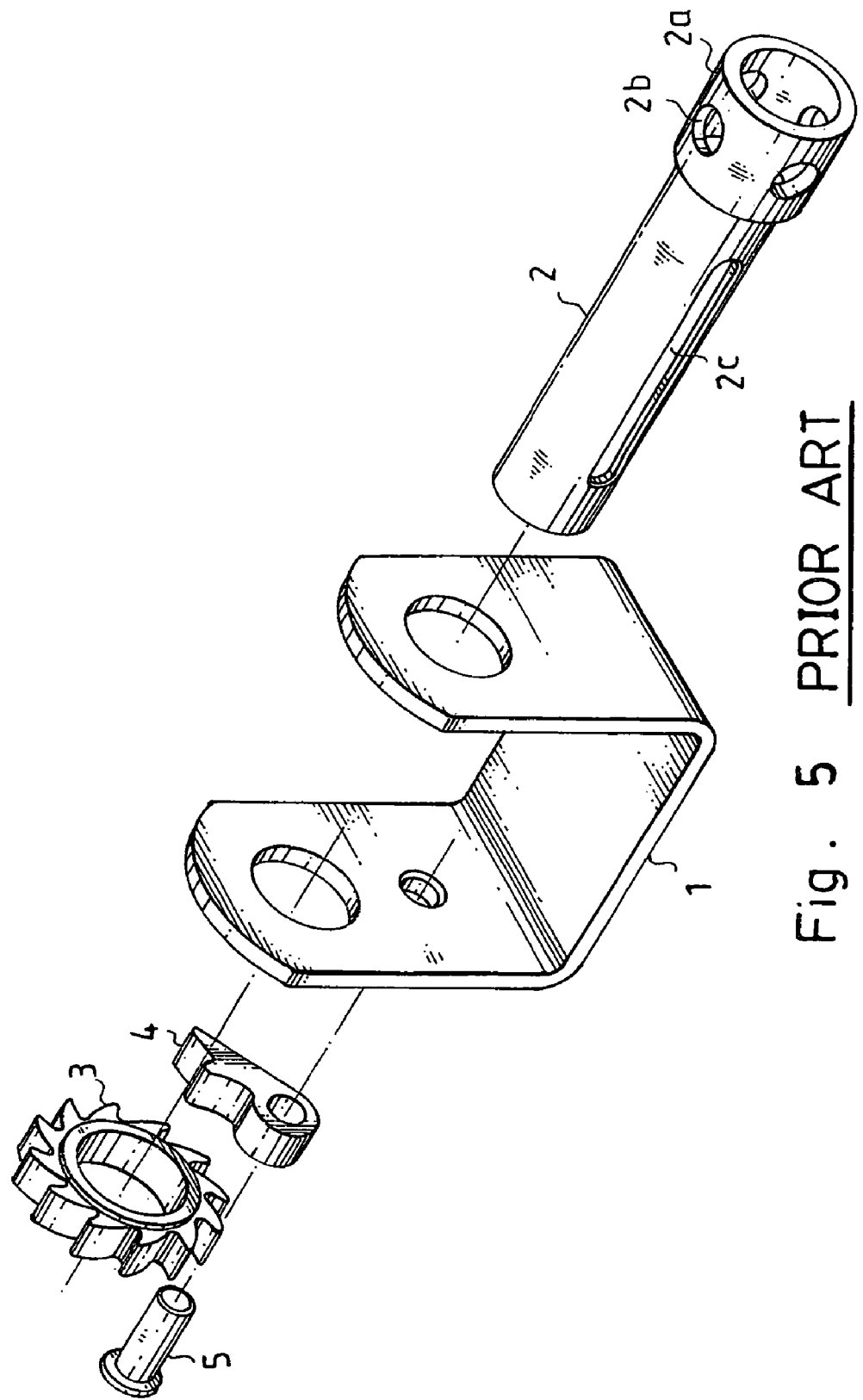
FIG. 5 is an exploded perspective view of a conventional binding device in accordance with the prior art.
Figure 6:
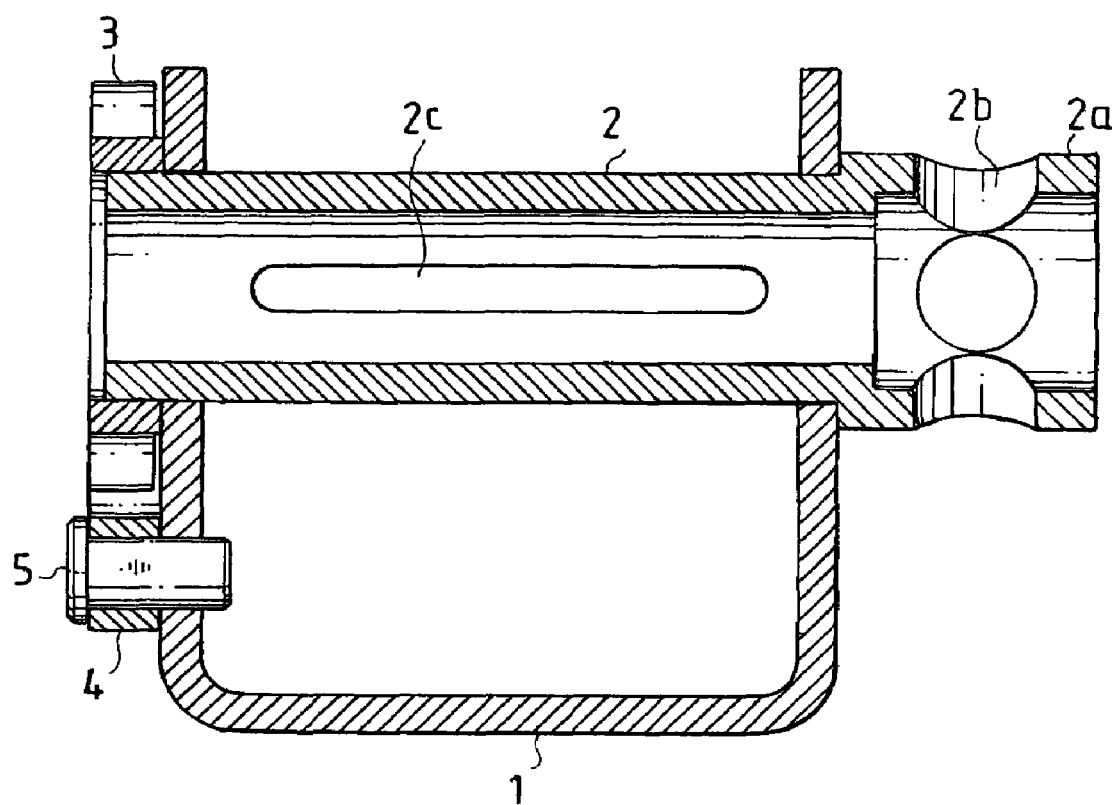
FIG. 6 is a plan cross-sectional assembly view of the conventional binding device as shown in FIG. 5.

In such a manner, when the drive member 23 is rotatable clockwise (in the first direction) as shown in FIG. 4, the driving pawl 223 is locked by one of the locking grooves 232 of the drive member 23 to rotate with the drive member 23, so that the driven member 22 is rotatable with the drive member 23, and the shaft tube 21 is rotatable with the driven member 22 to wind the binding strap, and when the drive member 23 is rotatable counterclockwise (in the second direction) as shown in FIG. 4, the driving pawl 223 is disengaged from the locking grooves 232 of the drive member 23, so that the driven member 22 is not rotatable with the drive member 23, and the drive member 23 performs an idle rotation.

Thus, the drive member 23 is rotatable in the first direction to rotate the shaft tube 21 to wind the binding strap and performs an idle rotation in the second direction, so that the shaft tube 21 is rotatable successively to wind the binding strap successively so as to tighten the cargo without having to remove the drive rod 60 from the drive member 23, thereby facilitating a user winding the binding strap.

Accordingly, the drive member 23 is rotatable by the drive rod 60 in a stageless manner, so that the shaft tube 21 is rotatable by the drive member 23 successively so as to wind the binding strap successively. In addition, the drive member 23 drives the shaft tube 21 to rotate in one direction only and performs an idle rotation in the opposite direction, so that the shaft tube 21 is rotatable successively to wind the binding strap successively so as to tighten the cargo without having to remove the drive rod 60 from the drive member 23, thereby facilitating a user winding the binding strap, and thereby saving the working time and energy. Further, the user can operate the drive member 23 to wind the binding strap successively without having to remove the drive rod 60 from the drive member 23, so that the binding strap is tightened easily and rapidly, thereby enhancing the working efficiency.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A binding device, comprising a drive mechanism including:
    a shaft tube;
    a driven member having a first side secured to an end of the shaft tube to rotate the shaft tube;
    at least one driving pawl mounted on a second side of the driven member;
    a drive member rotatably mounted on the second side of the driven member and having an inner wall formed with a plurality of locking grooves engaged with the driving pawl;
    wherein the inner wall of the drive member has a first end formed with a mounting recess mounted on the second side of the driven member to encompass the driving pawl.

2. The binding device in accordance with claim 1, wherein when the drive member is rotatable in a first direction, the driving pawl is locked by one of the locking grooves of the drive member to rotate with the drive member, so that the driven member is rotatable with the drive member, and the shaft tube is rotatable with the driven member, and when the drive member is rotatable in a second direction, the driving pawl is disengaged from the locking grooves of the drive member, so that the driven member is not rotatable with the drive member, and the drive member performs an idle rotation.

3. The binding device in accordance with claim 1, wherein the shaft tube has an inner wall formed with a shaft hole, and the first side of the driven member is formed with a plug inserted into the shaft hole of the shaft tube.

4. The binding device in accordance with claim 1, wherein the drive member has eight locking grooves.

5. The binding device in accordance with claim 1, wherein the locking grooves of the drive member are located in the mounting recess.

6. The binding device in accordance with claim 1, wherein the inner wall of the drive member has a second end formed with a opening.

7. The binding device in accordance with claim 6, wherein the drive member has a peripheral wall formed with at least two opposite passages connected to the opening to allow passage of a drive rod.

8. The binding device in accordance with claim 6, wherein the second side of the driven member has a central portion formed with a protruding threaded post having an inside formed with a screw bore, the inner wall of the drive member has a mediate portion formed with a mounting hole mounted on the threaded post of the driven member, the inner wall of the drive member is provided with a stepped stop face located between the mounting hole and the opening, and the drive mechanism further includes a locking bolt mounted in the opening of the drive member and having a bolt head rested on the stop face of the drive member and a threaded portion extended from the bolt head and screwed into the screw bore of the threaded post of the driven member to secure the drive member to the driven member.

9. The binding device in accordance with claim 8, wherein the drive mechanism further includes a dustproof washer mounted on the threaded portion of the locking bolt and located between the stop face of the drive member and the bolt head of the locking bolt to provide a dustproof function.

10. The binding device in accordance with claim 1, wherein the shaft tube has a peripheral wall formed with an elongated slot for fixing a binding strap.

11. A binding device, comprising a drive mechanism including:
- a shaft tube;
- a driven member having a first side secured to an end of the shaft tube to rotate the shaft tube;
- at least one driving pawl mounted on a second side of the driven member;
- a drive member rotatably mounted on the second side of the driven member and having an inner wall formed with a plurality of locking grooves engaged with the driving pawl;
- wherein the drive mechanism further includes a dustproof ring mounted between the periphery of the second side of the driven member and the inner wall of the drive member to provide a dustproof function.

12. A binding device, comprising a drive mechanism including:
- a shaft tube;
- a driven member having a first side secured to an end of the shaft tube to rotate the shaft tube;
- at least one driving pawl mounted on a second side of the driven member;
- a drive member rotatably mounted on the second side of the driven member and having an inner wall formed with a plurality of locking grooves engaged with the driving pawl;
- wherein the drive mechanism includes two opposite driving pawls each engaged with a respective one of the locking grooves of the drive member;
- wherein the second side of the driven member has a periphery formed with two opposite receiving recesses, and each of the driving pawls is pivotally mounted in a respective one of the receiving recesses of the driven member.

13. The binding device in accordance with claim 12, wherein the drive mechanism further includes two opposite restoring springs each biased between the driven member and a respective one of the driving pawls to push the respective driving pawl toward the respective locking groove of the drive member.

14. The binding device in accordance with claim 13, wherein each of the receiving recesses of the driven member has a first side formed with a first receiving groove and a second side formed with a second receiving groove, each of the driving pawls has a first end engaged with the respective locking groove of the drive member and a second end received in the first receiving groove of the driven member, and each of the restoring springs has a first end rested on a side of the first end of the respective driving pawl to push the first end of the respective driving pawl toward the respective locking groove of the drive member and a second end received in the second receiving groove of the driven member.

* * * * *